Figure 1:
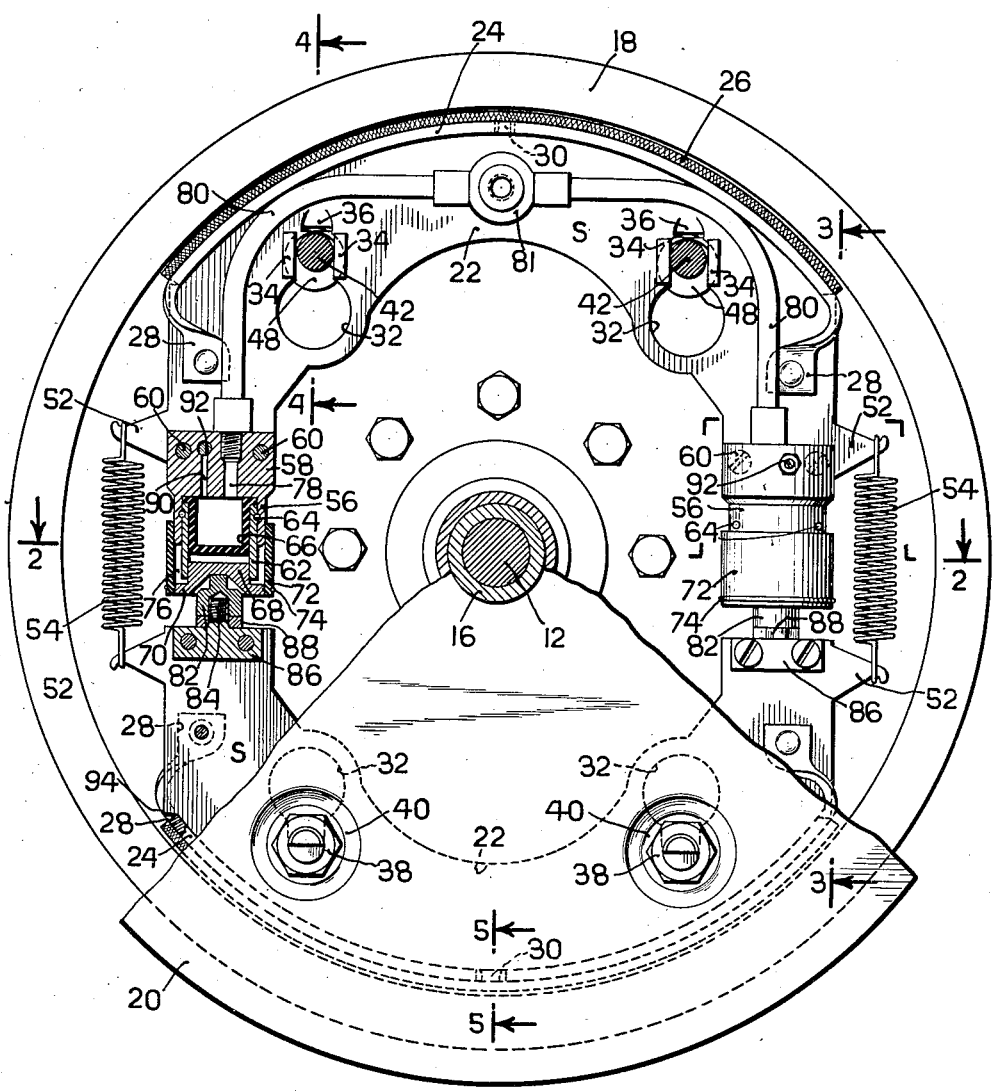

Oct. 4, 1932.                A. D. PENTZ                1,881,240
                            HYDRAULIC BRAKE
                    Filed April 21, 1928       2 Sheets-Sheet 1

Inventor
ALBERT D. PENTZ
By his Attorneys
Cooper, Kerr & Dunham

Oct. 4, 1932.  A. D. PENTZ  1,881,240
HYDRAULIC BRAKE
Filed April 21, 1928   2 Sheets-Sheet 2
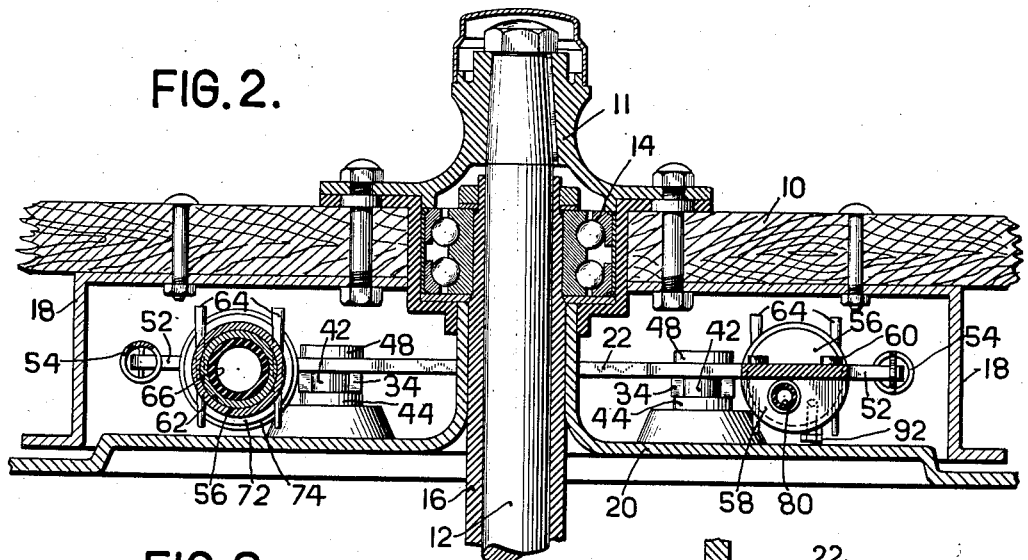
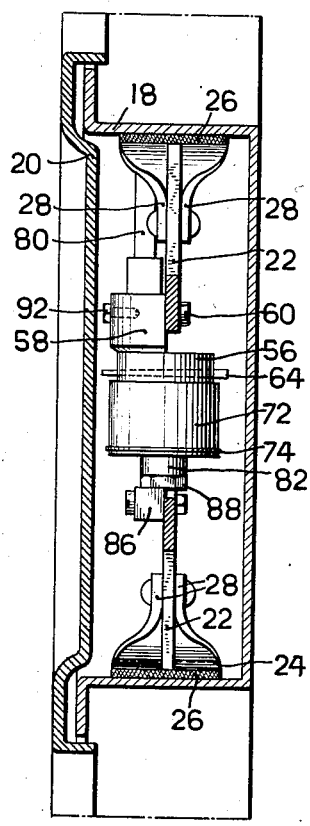
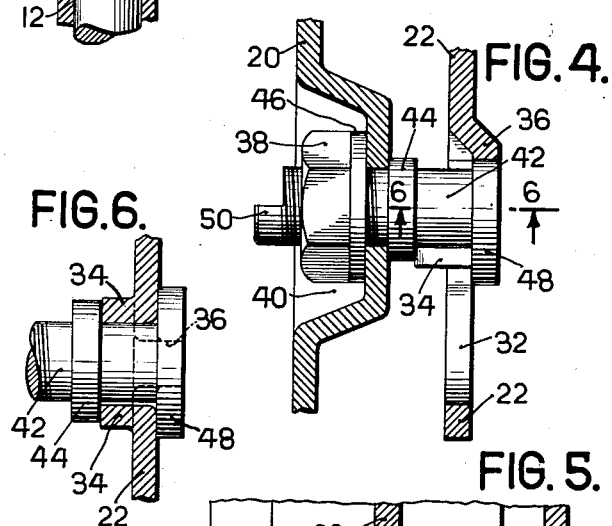
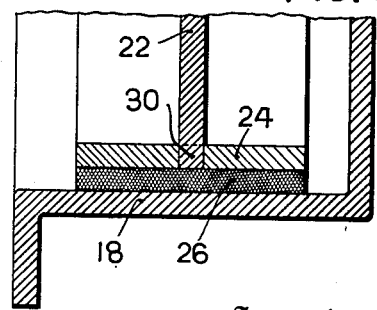
Inventor
ALBERT D. PENTZ
By his Attorneys
Cooper, Kerr & Dunham Patented Oct. 4, 1932

1,881,240

UNITED STATES PATENT OFFICE

ALBERT D. PENTZ, OF NEW YORK, N. Y., ASSIGNOR TO PENTZ MOTOR BRAKE CORPORATION, OF NEW YORK, N. Y., A CORPORATION OF NEW YORK

HYDRAULIC BRAKE

Application filed April 21, 1928. Serial No. 271,673.

This invention pertains to hydraulic brakes for vehicles. The brake illustrated and described is of the internal expanding type especially adapted for automobile use, and is an improvement on the invention disclosed in my copending application Serial No. 194,272, filed May 26, 1927.

An object of the invention is to provide a brake that is self-energizing to a predetermined degree for both forward and backward motion of the brake drum.

Another object is to provide a brake in which the shoes are not fixedly anchored at any point but are full floating.

Another object is to provide an improved form of the hydraulic actuating device.

Another object is to provide an improved form of pressed steel brake shoe.

Another object is to provide improved means for adjusting the amount of clearance between brake shoe and drum, thereby permitting the operator to readily maintain very slight clearance between shoe and drum, and minimizing lost motion of parts and reducing vibration and squealing.

Further and other objects and advantages will be apparent from the accompanying description and drawings which by way of illustration show what is considered the preferred embodiment of the invention.

Fig. 1 is a side view of the mechanism, partly in section.

Fig. 2 is a section on the line 2—2 of Fig. 1.
Fig. 3 is a section on the line 3—3 of Fig. 1.
Fig. 4 is a section on the line 4—4 of Fig. 1.
Fig. 5 is a section on the line 5—5 of Fig. 1.
Fig. 6 is a section on the line 6—6 of Fig. 4.

My brake is suitable for use on either the driving or steering wheels of automobiles. For purposes of illustration it is shown in connection with a driving wheel, as may best be understood from Fig. 2 in which 10 represents the wheel, keyed to an axle 12 through the instrumentality of hub flange 11 and mounted for rotation on bearings 14 on the non-rotating axle housing 16. Brake drum 18 is bolted to the wheel, and member 20 is fast at its hub to axle housing 16. Member 20 supports all the brake mechanism within the drum, and also serves as a shield to keep dust and dirt from the mechanism. For convenience member 20 will hereafter be referred to as a shield.

The brake is provided with upper and lower shoes S. Each shoe comprises a flat radial web 22 of sheet steel, and a circumferential flange 24, also of sheet steel. Brake lining 26 is secured to the outer surface of 24, the outer surface of the lining being of the same radius as the inner surface of the drum. Web 22 is at or near the center of flange 24. Flange 24 is split at its ends to form ears 28 through which bolts or rivets are passed to form web 22 and flange 24 into a unitary structure (Figs. 1, 3 and 5). The ears and web may be welded together if desired. To prevent sidewise movement of web 22 relatively to flange 24 a projection 30 formed on rib 22 enters a hole punched in flange 24 (Figs. 1 and 5). Each web 22 is perforated by two key-hole shaped slots 32, the metal from the narrow portions of the slots being pressed out to form wings or abutments 34 on the sides, and a wing 36 at the end of the narrow portion of the slot (Figs. 1 and 4). Wings 34 and 36 may be attached by spot welding if preferred. The larger end of the keyhole slot is simply a convenience in assembling the apparatus.

Passing through shield 20 are four studs 42. Each stud passes through the narrow portion of a slot 32, between wings 34 and is held in place by nut 38 which clamps shield 20 between shoulder 44 on stud 42 and lock washer 46. Nut 38 is set into countersunk recess 40 in shield 20. The inner end of each stud 42 is provided with an integral eccentric 48 in the path of travel of a wing 36, the eccentric therefore serving as an adjustable stop to regulate the clearance between brake shoe and drum. The outer end of each stud 42 is cut away to provide a projection 50 suitable for gripping with pliers or wrench to turn stud 42 and eccentric 48 whenever nut 38 is loosened.

As indicated in Fig. 1 there is slightly more clearance between each stud 42 and the wing 34 on the outer side of the stud than between each stud and its inner wing.

Each web 22 is provided with an integral hook 52 at each end of the web. A helical spring 54 is stretched between the upper and lower hooks at each end of the shoes in order to retract the shoes at 36 against eccentric stops 48 when hydraulic pressure is released.

Between the adjacent ends of the upper and lower shoes S are the two hydraulic actuating devices, each device being operatively attached to upper web 22. Each hydraulic device comprises a downwardly projecting cylinder 56 having an extension 58 through which pass screws 60 to fasten the member to upper web 22. Cylinder 56 is lined with a metallic sleeve 62 grooved circumferentially near its upper end and held in position by pins or wires 64 passing through holes in cylinder 56 and engaging the groove in sleeve 62. This construction provides ready means for removing or replacing sleeve 62.

Within cylinder 56 and sleeve 62 is a hat-shaped rubber expansible member 66. The above described insertable sleeve arrangement provides ready means for applying and maintaining proper predetermined pressure on the rim or flange of member 66 whereby leakage is prevented without undue compression and consequent injury of the rubber. Fitted into the lower end of sleeve 62 is a piston 68 which has a radial flange 70 of the same diameter as the outside of cylinder 56. A tubular boot 72 of rubber or leather is secured to flange 70, preferably by wire ring 74, and extends upwardly around cylinder 56, thereby providing between cylinder 62 and boot 72 a space 76 adapted to contain grease or other lubricant, and to exclude dirt, etc., from working parts.

Hydraulic operating fluid is admitted to the interior of members 66 through passages 78 and pipes 80 which enter a fitting 81 attached to web 22 of the upper shoe. Members 66 and the pipes connected thereto are normally full of fluid, usually oil, and when additional oil is forced through fitting 81 and pipes 80 into an expansible member 66, that member expands, thereby forcing piston 68 downwardly. The lower end of piston 68 is countersunk to accommodate the upper end of a cap 82 which is threaded to stud 84 extending upwardly from a block 86 which is fast to an end of the lower brake shoe. The adjustment of cap 82 is locked by nut 88.

A passage 90 is provided to act as a bleeder for removing any air entrapped in member 66. The upper end of passage 90 may be opened or sealed by screw 92.

With the above construction in mind it will be apparent that when members 66 expand and the pistons 68 move, the upper brake shoe will be forced upwardly and the lower shoe downwardly with equal force to apply the shoes to the drum. When the pressure in members 66 is relieved, springs 54 will draw the shoes back to their normal positions against stops 36, and pistons 68 will be retracted into their cylinders.

The apparatus above described is known as a "full floating" brake design because the shoes and parts attached thereto are not pivoted fixedly at any particular point but move bodily outwardly and inwardly, guided by studs 42.

Although the shoes are not fulcrumed fixedly at any particular point, each shoe is really, so far as braking effect is concerned, fulcrumed on one or the other of its guiding studs 42, depending on the direction in which the brake drum 18 is rotating. This has the important effect of making the brake self-energizing in either direction as may be understood from Fig. 1. When the shoes are moved outwardly, impelled by the hydraulic devices, all studs 42 act simply to guide the shoes for straight line motion. But that condition changes as soon as the shoes encounter the rotating drum. The drum tends to carry the shoes with it in the direction of rotation. For instance if the drum is rotating clockwise (Fig. 1) the right upper and left lower inner wings 34 will be forced into contact with their respective studs 42, while all wings of both shoes will be out of contact with the other two studs. This means that for rotation in clockwise direction the shoes, while in contact with the rotating drum, are fulcrumed on the upper right and lower left studs. As these pivot points are at the end of the shoes furthest advanced in the direction of rotation the action of the brake is self-energizing, or, in other words, the rotation of the drum serves to force both brake shoes into closer contact with the drum.

If the drum rotates in the opposite direction, counterclockwise, the upper left and lower right studs will act as pivots and the brake will therefore be self-energizing in that direction also.

In the drawings the present brake is shown with right and left studs 42 spaced equal distances from the vertical center line, therefore the brake is self-energizing to the same degree in both directions. The amount of self-energization depends upon the location of the stud which is acting as the fulcrum. The further the fulcrum stud is advanced in the direction of rotation the more pronounced will be the self-energization. By judicious location of studs 42, therefore, the brake may be designed to have any desired degree of self-energization in either direction.

Referring to Figs. 4 and 6, it will be noted that wings 34 extend from shoulder 44 to eccentric 48, thereby preventing sidewise shifting and rocking of web 22, with the result that the brake shoes are held in predetermined position relatively to the other mechanism.

At the left end of the lower shoe (Fig. 1) the front ear 28 has been broken away to show the integral shoulder 94 formed at each end of the shoe to fit into the crotch formed in flange 24 between the two ears 28. This arrangement prevents circumferential movement of flange 24 relatively to web 22.

It is to be understood that the invention is not limited to the specific construction herein illustrated and described but may be embodied in other ways without departure from its spirit as defined by the appended claims.

I claim—

1. In a brake mechanism for vehicles, a hydraulic actuating device comprising in combination, an outer cylinder, a lining sleeve within said cylinder and projecting from the open end of said cylinder, a piston in said sleeve and projecting from the open end thereof, a radial flange on the projecting end of said piston, the diameter of said flange being the same as the diameter of said outer cylinder, and a boot attached to said flange and surrounding said cylinder whereby a space for lubricant is provided between said boot and said sleeve substantially as described.

2. In a brake mechanism for vehicles, a hydraulic actuating device comprising, in combination, an outer cylinder, a resilient member within said outer cylinder, a sleeve fitted within said outer cylinder in order to compress a portion of said resilient member into engagement with said cylinder, and means for determining the space into which said portion is compressed and for locking said sleeve within the determined relation.

3. In a brake mechanism for vehicles, a hydraulic actuating device comprising, in combination, an outer cylinder, a resilient member within said outer cylinder, a sleeve fitted within said outer cylinder in order to compress a portion of said resilient member into engagement with said cylinder, and means passing through said cylinder and interlocked with said sleeve to hold said sleeve compressed against said portion and to determine the space into which said portion is compressed.

4. In a brake mechanism for vehicles, a hydraulic actuating device comprising, in combination, an outer cylinder, a resilient member within said outer cylinder, a sleeve fitted within said outer cylinder in order to compress a portion of said resilient member into engagement with said cylinder, and pins passing through said cylinder and interlocked with said sleeve to hold same compressed against said portion and to determine the dimensions of the space into which said portion is compressed.

In testimony whereof I hereto affix my signature.

ALBERT D. PENTZ.